United States Patent
Dambayashi et al.

(10) Patent No.: US 9,130,949 B2
(45) Date of Patent: Sep. 8, 2015

(54) ANONYMIZING APPARATUS AND ANONYMIZING METHOD

(71) Applicant: FUJITSU LIMITED, Kawasaki-shi, Kanagawa (JP)

(72) Inventors: Shigeyuki Dambayashi, Kakogawa (JP); Ichiro Eguchi, Akashi (JP); Tsuyoshi Oyake, Akashi (JP); Wataru Tomiyama, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 118 days.

(21) Appl. No.: 13/890,532

(22) Filed: May 9, 2013

(65) Prior Publication Data

US 2014/0006553 A1 Jan. 2, 2014

(30) Foreign Application Priority Data

Jun. 27, 2012 (JP) ................. 2012-144591

(51) Int. Cl.
*G06F 15/16* (2006.01)
*H04L 29/08* (2006.01)
*H04L 29/06* (2006.01)

(52) U.S. Cl.
CPC ............ *H04L 67/10* (2013.01); *H04L 63/0421* (2013.01)

(58) Field of Classification Search
CPC ................ H04L 67/10; H04L 63/0421; G06F 17/30386; G06F 21/6245; G06F 21/6254
USPC ......... 709/217; 707/E17, 757, 758, 781, 783, 707/785; 380/28, 44, 54; 713/167
See application file for complete search history.

(56) References Cited

U.S. PATENT DOCUMENTS

| | | | |
|---|---|---|---|
| 5,915,248 A | 6/1999 | Kinoshita et al. | |
| 2005/0283621 A1 | 12/2005 | Sato et al. | |
| 2006/0230026 A1* | 10/2006 | Pereira | 707/3 |
| 2010/0034376 A1* | 2/2010 | Okuizumi et al. | 380/44 |
| 2010/0169332 A1* | 7/2010 | Bezzi | 707/757 |
| 2011/0277037 A1* | 11/2011 | Burke et al. | 726/26 |
| 2013/0239226 A1* | 9/2013 | Miyakawa | 726/26 |

FOREIGN PATENT DOCUMENTS

| | | |
|---|---|---|
| JP | 4-273378 | 9/1992 |
| JP | 9-245043 | 9/1997 |
| JP | 2005-301978 | 10/2005 |
| JP | 2008-22145 | 1/2008 |
| JP | 2010-237811 | 10/2010 |

* cited by examiner

*Primary Examiner* — Hitesh Patel
(74) *Attorney, Agent, or Firm* — Oblon, McClelland, Maier & Neustadt, L.L.P.

(57) ABSTRACT

An anonymizing apparatus includes a processor configured to receive an instruction from a first apparatus, anonymize an anonymized part of a first data based on a type of an application program that causes the first apparatus to send the instruction, and transmit the anonymized first data to the first apparatus.

6 Claims, 22 Drawing Sheets

FIG. 3

| TYPE ID | NAME | AGE | SHOP NAME | TYPE |
|---|---|---|---|---|
| 1 | azeid11 | 12 | ○○ | A01 |
| | A12345 | 1 | ×× | B02 |
| | kdDsDD | 24 | ×× | C03 |
| | KI3IIs3Q | 33 | △△△ | D04 |

FIG. 4

| APPLICATION | KEY ⟨18b |
|---|---|
| A | 00001 |
| B | 00002 |
| C | 00003 |
| D | 00004 |
| ... | ... |

FIG. 5

| NAME | AGE | SHOP NAME | TYPE |
|---|---|---|---|
| AAAAA | 12 | ○○ | BARD |
| BBBBB | 1 | ×× | DOG |
| CCCCC | 24 | ×× | TURTLE |
| DDDDD | 33 | △△△ | CAT |

FIG. 6

| NAME | AGE | SHOP NAME | TYPE |
|---|---|---|---|
| EEEEE | 12 | SHOP A | A01 |
| FFFFF | 1 | SHOP B | B02 |
| GGGGG | 24 | SHOP B | C03 |
| HHHHH | 33 | SHOP D | D04 |

FIG. 7

| NAME | AGE | SHOP NAME | TYPE |
|---|---|---|---|
| IIIII | 22 | ○○ | A01 |
| JJJJJ | 32 | ×× | B02 |
| KKKKK | 44 | ×× | C03 |
| LLLLL | 52 | △△△ | D04 |

FIG. 11

| TYPE ID | NAME | DATE | SHOP NAME | SALES AMOUNT |
|---------|---------|------|-----------|--------------|
| 11 | azeid11 | 12 | ○○ | A01 |
| | A12345 | 1 | ×× | B02 |
| | kdDsDD | 24 | ×× | C03 |
| | A12345 | 33 | △△△ | D04 |

FIG. 12

| GROUP | OFFSET |
|-------|--------|
| AA    | 2,4    |

FIG. 13

| NAME | DATE | SHOP NAME | SALES AMOUNT |
|---|---|---|---|
| j2a9f2e | 12 | ○○ | 200 |
| a12345 | 1 | ×× | 100 |
| 13kksow | 24 | ×× | 300 |
| c94ersy | 33 | △△△ | 500 |

FIG. 14

| NAME | SALES AMOUNT |
|---|---|
| a12345 | 600 |

FIG. 18
RELATED ART 93a,93b

| TYPE ID | NAME | AGE | SHOP NAME | TYPE |
|---|---|---|---|---|
| 1 | TARO FUJI | 22 | SHOP A | BARD |
| | JIRO KOBE | 32 | SHOP B | DOG |
| | ICHIRO TOKYO | 44 | SHOP B | TURTLE |
| | JIRO AICHI | 52 | SHOP D | CAT |

FIG. 19
RELATED ART

| TYPE ID | NAME | AGE | SHOP NAME | TYPE |
|---|---|---|---|---|
| 1 | azeid11 | 12 | ○○ | A01 |
| | A12345 | 1 | ×× | B02 |
| | kdDsDD | 24 | ×× | C03 |
| | Kl3lls3Q | 33 | △△△ | D04 |

FIG. 20
RELATED ART

| NAME | AGE | SHOP NAME | TYPE |
|---|---|---|---|
| azeid11 | 12 | ○○ | BARD |
| A12345 | 1 | ×× | DOG |
| kdDsDD | 24 | ×× | TURTLE |
| Kl3lls3Q | 33 | △△△ | CAT |

FIG. 21
RELATED ART

| NAME | AGE | SHOP NAME | TYPE |
|---|---|---|---|
| azeid11 | 12 | A SHOP | A01 |
| A12345 | 1 | B SHOP | B02 |
| kdDsDD | 24 | B SHOP | C03 |
| Kl3lls3Q | 33 | D SHOP | D04 |

FIG. 22
RELATED ART

| NAME | AGE | SHOP NAME | TYPE |
|---|---|---|---|
| azeid11 | 22 | ○○ | A01 |
| A12345 | 32 | ×× | B02 |
| kdDsDD | 44 | ×× | C03 |
| Kl3lls3Q | 52 | △△△ | D04 |

ANONYMIZING APPARATUS AND ANONYMIZING METHOD

CROSS-REFERENCE TO RELATED APPLICATION

This application is based upon and claims the benefit of priority of the prior Japanese Patent Application No. 2012-144591, filed on Jun. 27, 2012, the entire contents of which are incorporated herein by reference.

FIELD

The embodiments discussed herein are related to data anonymity.

BACKGROUND

There is an integrating device that acquires anonymized data from a certain device such as a server, causes the acquired data to be stored in a storage device for each of types of the data and integrates the acquired data for each of the types of the data. In response to a request provided by another device, the integrating device acquires the anonymized data from the storage device, releases anonymity of an item of the anonymized data and transmits the data including the data item of which the anonymity has been released to the other device that has requested the data. The other device that receives the data including the data item of which the anonymity has been released uses details of the data item to execute predetermined analysis.

FIG. 17 is a diagram illustrating an example of a system that includes the conventional integrating device. A system 99 illustrated in FIG. 17 includes devices 90a, 90b, 92a, 92b and 92c and an integrating device 91. The devices 90a and 90b are connected to the integrating device 90 through a network 98. In addition, the devices 92a, 92b and 92c are connected to the integrating device 91 through a network 97. The devices 90a and 90b and the integrating device 91 communicate with each other, while the devices 92a, 92b and 92c and the integrating device 91 communicate with each other.

The devices 90a and 90b have databases (DBs) 93a and 93b, respectively, while data that indicates purchase histories of purchasers who have purchased pets such as animals at pet shops is registered in the DBs 93a and 93b. FIG. 18 illustrates an example of data structures of the DBs 93a and 93b. A table is registered in the DBs 93a and 93b illustrated in FIG. 18 for each of types of data. Each of records of a table illustrated in FIG. 18 includes a "name" item, an "age" item, a "shop name" item and a "type" item. In the "name" item, the names of the purchasers of the pets are registered. The names of the purchasers of the pets are data that specifies the individuals. In the "age" item, the ages of the purchasers are registered. In the "shop name" item, the names of the shops at which the purchasers have purchased the pets are registered. In the "type" item, the types of the purchased pets are registered. The table illustrated in FIG. 18 has a "type ID" item in which a type ID that is an identification (ID) used to identify the type of the data registered in the table is registered. As described above, the data that indicates the purchase histories of the purchasers of the pets is registered in the table illustrated in FIG. 18. A type ID "1" that identifies the data indicating the purchase histories of the purchasers of the pets is registered in the "type ID" item of the table illustrated in FIG. 18.

The devices 90a and 90b acquire data of one or more records from the DBs 93a and 93b and make the acquired data anonymous. For example, the devices 90a and 90b use a predetermined key and a predetermined hash function to calculate hash values for the acquired data of items of the records and make the data anonymous. Then, the devices 90a and 90b add the type ID registered in the "type ID" item of the table to the anonymized data. Subsequently, the devices 90a and 90b transmit the data having the type ID added thereto to the integrating device 91. It is assumed that the system 99 includes a device (not illustrated) other than the devices 90a and 90b, while the device (not illustrated) makes various types of data anonymous using the same method and transmits the data to the integrating device 91.

The integrating device 91 integrates data for each of types of data. The integrating device 91 has tables 91a, 91b, . . . corresponding to the types of the data. FIG. 19 illustrates an example of data structures of the tables included in the conventional integrating device 91. The table 91a illustrated in 19 is a table in which hash values of the data that is of a type identified by the type ID "1" or indicates the purchase histories of the purchasers of the pets are registered.

When receiving data having a type ID added thereto from the devices 90a and 90b and the aforementioned device that is not illustrated, the integrating device 91 acquires the type ID added to the received data. Then, the integrating device 91 registers the received data in a table that is among the tables 91a, 91b, . . . corresponding to type IDs and corresponds to the acquired type ID. For example, when receiving data with the type ID "1" added thereto from the device 90a, the integrating device 91 registers the received data in the table 91a that is among the tables 91a, 91b, . . . corresponding to the type IDs and corresponds to the type ID "1". Thus, the data that is made anonymous and indicates the purchase histories of the purchasers of the pets is registered in the table 91a corresponding to the type ID "1".

In addition, when receiving, from the devices 92a, 92b and 92c, data transmission instructions that include a type ID of data be analyzed and items to be analyzed, the integrating device 91 executes the following process. That is, the integrating device 91 acquires data of all records registered in a table corresponding to the type ID included in the received instructions. For example, when the type ID included in the received instructions is "1", the integrating device 91 acquires data of all records registered in the table 91a corresponding to the type ID "1".

Then, the integrating device 91 releases anonymity of data that is included in the acquired data of all the records and has been registered in the items that are to be analyzed and are included in the received instructions. For example, the integrating device 91 uses the same key as a key used for making the data anonymous and the same hash function as a hash function used for making the data anonymous and thereby restores, to the original data, hash values that are included in data of acquired hash values and have been registered in the items to be analyzed. Then, the integrating device 91 transmits the data of which the anonymity has been released and that has been registered in the items to be analyzed to the devices 92a, 92b and 92c that have transmitted the instructions.

For example, when receiving, from the device 92a, a data transmission instruction that includes a type ID "1" of data to be analyzed and the "type" item to be analyzed, the integrating device 91 executes the following process. That is, the integrating device 91 acquires data of hash values of all records registered in the table 91a corresponding to the type ID "1" and restores, to the original data, hash values that are included in the acquired data of the hash values and have been registered in the "type" item to be analyzed. FIG. 20 illustrates an example of data of hash values when the hash values of the "type" item to be analyzed are restored to the original data by the conventional integrating device 91. For example, when acquiring the data of the hash values of all the records registered in the table 91a corresponding to the type ID "1", the integrating device 91 restores a hash value "A01" of the "type" item to be analyzed to the original data "bird", as illustrated in the example of FIG. 20. In addition, the integrating device 91 restores a hash value "B02" of the "type" item to be analyzed to the original data "dog". The integrating device 91 restores a hash value "C03" of the "type" item to be analyzed to the original data "turtle". The integrating device 91 restores a hash value "D04" of the "type" item to be analyzed to the original data "cat". Then, the integrating device 91 transmits, to the device 92a, the original data illustrated in FIG. 20 and restored from the hash values of the "type" item to be analyzed.

When receiving, from the device 92b, a data transmission instruction that includes the type ID "1" of the data to be analyzed and the "shop name" item to be analyzed, the integrating device 91 executes the following process. That is, the integrating device 91 acquires the data of the hash values of all the records registered in the table 91a corresponding to the type ID "1" and restores, to the original data, hash values that are included in the acquired data of the hash values and have been registered in the "shop name" item to be analyzed. FIG. 21 illustrates an example of data of hash values when the hash values of the "shop name" item to be analyzed are restored to the original data by the conventional integrating device 91. For example, when acquiring the data of the hash values of all the records registered in the table 91a corresponding to the type ID "1", the integrating device 91 restores a hash value "00" of the "shop name" item to be analyzed to the original data "shop A", as illustrated in the example of FIG. 21. In addition, the integrating device 91 restores hash values "xx" of the "shop name" item to be analyzed to the original data "shop B". The integrating device 91 restores a hash value "ΔΔΔ" of the "shop name" item to be analyzed to the original data "shop D". Then, the integrating device 91 transmits, to the device 92b, the original data illustrated in FIG. 21 and restored from the hash values of the "shop name" item to be analyzed.

When receiving, from the device 92c, a data transmission instruction that includes the type ID "1" of the data to be analyzed and the "age" item to be analyzed, the integrating device 91 executes the following process. That is, the integrating device 91 acquires the data of the hash values of all the records registered in the table 91a corresponding to the type ID "1" and restores, to the original data, hash values that are included in the acquired data of the hash values and have been registered in the "age" item to be analyzed. FIG. 22 illustrates an example of data of hash values when the hash values of the "age" item to be analyzed are restored to the original data by the conventional integrating device 91. For example, when acquiring the data of the hash values of all the records registered in the table 91a corresponding to the type ID "1", the integrating device 91 restores a hash value "12" of the "age" item to be analyzed to the original data "22", as illustrated in the example of FIG. 22. In addition, the integrating device 91 restores a hash value "1" of the "age" item to be analyzed to the original data "32". The integrating device 91 restores a hash value "24" of the "age" item to be analyzed to the original data "44". The integrating device 91 restores a hash value "33" of the "age" item to be analyzed to the original data "52". Then, the integrating device 91 transmits, to the device 92c, the original data illustrated in FIG. 22 and restored from the hash values of the "age" item to be analyzed.

The devices 92a, 92b and 92c are devices that execute various types of analysis. For example, the device 92a uses the data indicating the purchase histories of the purchasers of the pets and executes an application for counting the number of purchased pets for each of the types of the pets. The device 92a executes the application and thereby transmits, to the integrating device 91, the data transmission instruction that includes the type ID "1" of data to be analyzed and the item "type" to be analyzed. When receiving, from the integrating device 91, the original data restored from the hash values of the item "type" to be analyzed, the device 92a counts the number of purchased pets for each of the types of the pets.

The device 92b uses the data indicating the purchase histories of the purchasers of the pets and executes an application for counting the number of purchased pets for each of the pet shops. The device 92b executes the application and thereby transmits, to the integrating device 91, the data transmission instruction that includes the type ID "1" of the data to be analyzed and the "shop name" item to be analyzed. When receiving, from the integrating device 91, the original data restored from the hash values of the "shop name" item to be analyzed, the device 92b counts the number of purchased pets for each of the pet shops.

The device 92c uses the data indicating the purchase histories of the purchasers of the pets and executes an application for counting the number of purchased pets for each of the ages of the purchasers. The device 92c executes the application and thereby transmits, to the integrating device 91, the data transmission instruction that includes the type ID "1" of the data to be analyzed and the "age" item to be analyzed. When receiving, from the integrating device 91, the original data restored from the hash values of the "age" item to be analyzed, the device 92c counts the number of purchased pets for each of the ages of the purchasers.

In addition, there is a technique for using first key information to generate a certain hash value for information that is included in personal information and identifies the individual, using second key information to generate a new hash value for the generated certain hash value, and making anonymous the information identifying the individual.

For example, Japanese Laid-open Patent Publication No. 2010-237811, Japanese Laid-open Patent Publication No. 2005-301978, Japanese Laid-open Patent Publication No. 09-245043, Japanese Laid-open Patent Publication No. 2008-22145, Japanese Laid-open Patent Publication No. 04-273378 are issued.

The aforementioned system, however, has a problem that it is easy to interpret anonymized data. For example, when the devices 92a to 92c have the three data items illustrated in the examples of FIGS. 20 to 22, respectively, and the data items flow out of the devices 92a to 92c, a person may be identified by the following method on the basis of the data items that have flowed out of the devices 92a to 92c. That is, information that is registered in the "name" item and common to the three data items and is, for example, records in which a name "A12345" is registered is identified from the three data items, and information of which anonymity is released and that is "32", "shop B" and "dog" is identified from the identified records. Thus, the fact that a person indicated by the information including the anonymous name "A12345" is 32 years old and has purchased a dog at the shop B is identified. Thus, it is easy to identify the person on the basis of the information indicating that the person is 32 years old and has purchased the dog at the shop B. The aforementioned system, therefore, has the problem that it is easy to interpret anonymized data.

A method for applying a technique for making anonymous information identifying an individual to the aforementioned system and making a purchaser's name registered in the "name" item anonymous may be considered. In this method, a hash value is generated using first key information for information of the name of a purchaser, and a new hash value is generated using second key information for the generated hash value. Even if this method is used, however, a record in which a newly generated hash value is registered may be identified from a plurality of data items transmitted from the integrating device, and information of which anonymity is released may be identified from the identified record. Thus, even if this method is used, there is a problem that it is easy to interpret anonymized data.

SUMMARY

According to an aspect of the invention, an anonymizing apparatus includes a processor configured to receive an instruction from a first apparatus, anonymize an anonymized part of a first data based on a type of an application program that causes the first apparatus to send the instruction, and transmit the anonymized first data to the first apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of data structures of tables registered in a DB included in the anonymity providing device;

FIG. 4 illustrates an example of a data structure of a table included in the anonymity providing device;

FIG. 5 illustrates an example of data when hash values of a "type" item to be analyzed are restored to the original data by the anonymity providing device;

FIG. 6 illustrates an example of data when hash values of a "shop name" item to be analyzed are restored to the original data by the anonymity providing device;

FIG. 7 illustrates an example of data when hash values of an "age" item to be analyzed are restored to the original data by the anonymity providing device;

FIG. 11 illustrates an example of a data structure of a table registered in the DB included in the anonymity providing device;

FIG. 12 illustrates an example of a data structure of group data;

FIG. 13 illustrates an example of data when hash values of name data are generated by the anonymity providing device using different keys, and hash values of a "sales amount" item to be analyzed are restored to the original data;

FIG. 14 illustrates an example of a result of analysis;

FIG. 18 illustrates an example of data structures of DBs;

FIG. 19 illustrates an example of data structures of tables included in the integrating device;

FIG. 20 illustrates an example of data of hash values when the hash values of a "type" item to be analyzed are restored to the original data by the integrating device;

FIG. 21 illustrates an example of data of hash values when the hash values of a "shop name" item to be analyzed are restored to the original data by the integrating device; and FIG. 22 illustrates an example of data of hash values when the hash values of an "age" item to be analyzed are restored to the original data by the integrating device.

DESCRIPTION OF EMBODIMENTS

Hereinafter, embodiments of a anonymity providing device disclosed herein, a anonymity providing program disclosed herein and a anonymity providing method disclosed herein are described in detail with reference to the accompanying drawings. A technique disclosed herein is not limited to the embodiments. The embodiments may be combined without a discrepancy between details of processes.

First Embodiment

Figure 1:
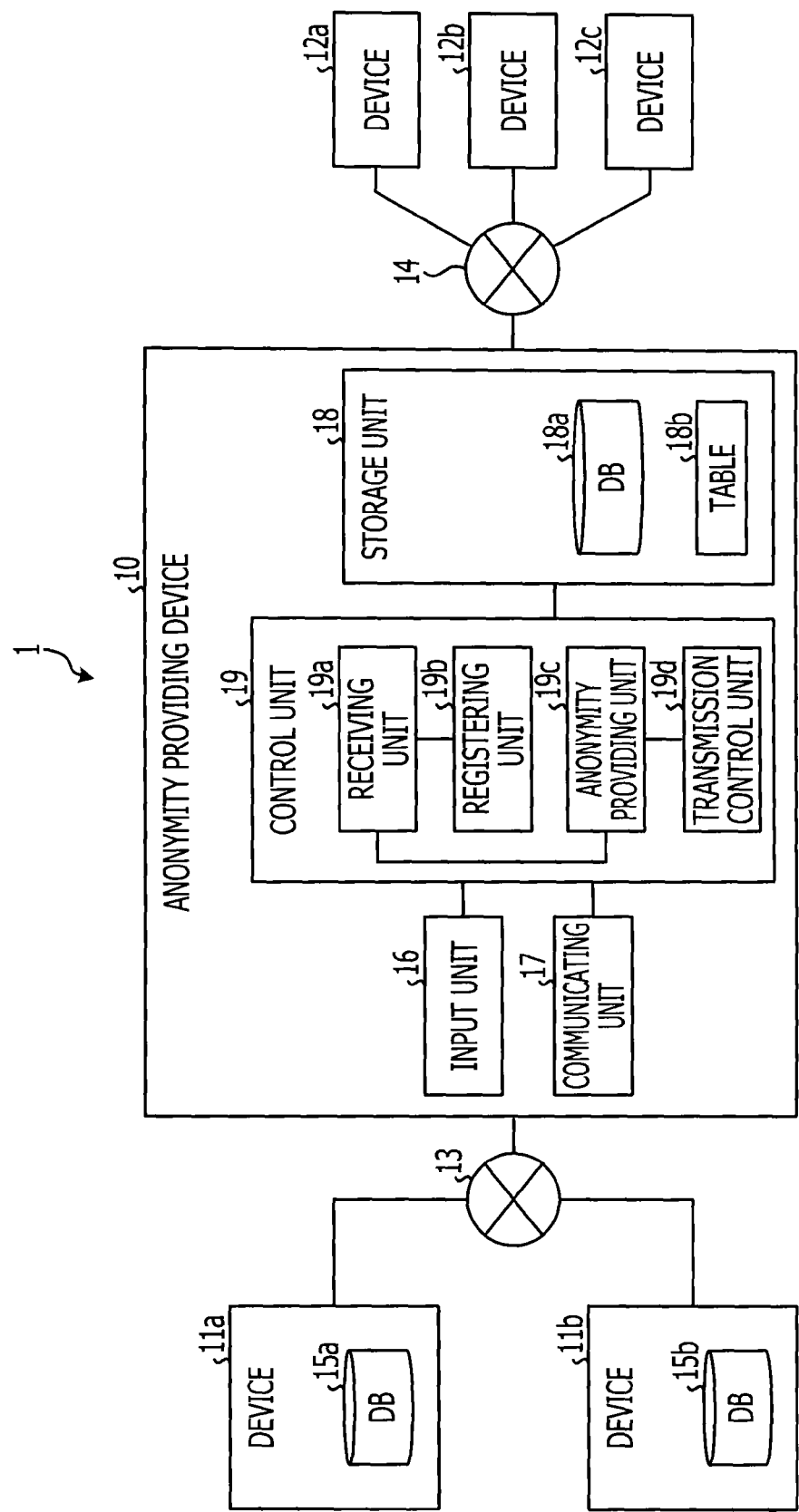
FIG. 1 illustrates an example of the configuration of a system that includes a anonymity providing device according to a first embodiment.

A anonymity providing device 10 according to the first embodiment is described below. FIG. 1 illustrates an example of the configuration of a system that includes the anonymity providing device 10 according to the first embodiment. A system 1 illustrated in the example of FIG. 1 has the anonymity providing device 10 and devices 11a, 11b, 12a, 12b and 12c. In addition, the system 1 has a device (not illustrated) that has the same functions as the devices 11a and 11b. The devices 11a and 11b, the device (not illustrated) and the anonymity providing device 10 are connected to each other through a network 13. The anonymity providing device 10 and the devices 12a, 12b and 12c are connected to each other through a network 14. The devices 11a, 11b and the anonymity providing device 10 communicate with each other. The anonymity providing device 10 and the devices 12a, 12b and 12c communicate with each other.

Figure 2:
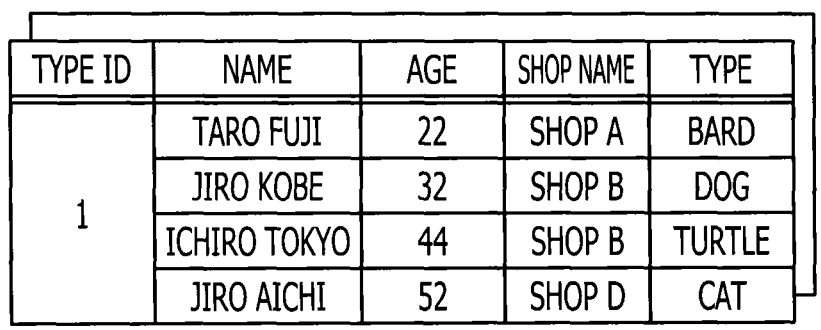
FIG. 2 illustrates an example of data structures of DBs.

The devices 11a and 11b have DBs 15a and 15b, respectively, while data that indicates purchase histories of purchasers who have purchased pets such as animals at pet shops is registered in the DBs 15a and 15b. FIG. 2 illustrates an example of data structures of the DBs 15a and 15b. A table is registered in each of the DBs 15a and 15b illustrated in the example of FIG. 2 for each of types of data. Records of a table illustrated in the example of FIG. 2 each include a "name" item, an "age" item, a "shop name" item and a "type" item. In the "name" item, the names of purchasers of pets are registered. The names of the purchasers of the pets are data that identifies the individuals. In the "age" item, the ages of the purchasers are registered. In the "shop name" item, the names of shops at which the purchasers have purchased the pets are registered. In the "type" item, the types of the purchased pets are registered. The table illustrated in the example of FIG. 2 has a "type ID" item in which a type ID that is an ID identifying the type of the data registered in the DBs 15a and 15b is registered. As described above, the data that indicates the purchase histories of the purchasers of the pets is registered in the tables of the DBs 15a and 15b illustrated in the example of FIG. 2. A type ID "1" that identifies the data indicating the purchase histories of the purchasers of the pets is registered in the "type ID" items of the tables of the DBs 15a and 15b illustrated in the example of FIG. 2.

The devices 11a and 11b acquire data of one or more records from the tables of the DBs 15a and 15b and make the acquired data anonymous. For example, the devices 11a and 11b use a predetermined key and a predetermined hash function to calculate hash values for data of items of the acquired records, replace the data of the items of the acquired records with data of the calculated hash values and make the acquired data anonymous. Then, the devices 11a and 11b add the type ID registered in the "type ID" items of the tables of the DBs 15a and 15b to the anonymized data. Subsequently, the devices 11a and 11b transmit the data having the type ID added thereto to the anonymity providing device 10. As described above, it is assumed that the system 1 includes the device (not illustrated) that makes various types of data anonymous using the same method as described above and transmits the anonymized data to the anonymity providing device 10.

The anonymity providing device 10 includes an input unit 16, a communicating unit 17, a storage unit 18 and a control unit 19.

The input unit 16 causes various types of information to be input to the control unit 19. For example, the input unit 16 receives an instruction from a user and causes the received instruction to be input to the control unit 19. Examples of the input unit 16 are devices that receive an operation of the user and are a mouse and a keyboard.

The communicating unit 17 is an interface for executing communication between the anonymity providing device 10 and the other devices. For example, when receiving anonymized data from the devices 11a and 11b through the network 13, the communicating unit 17 transmits the received data to the control unit 19. When receiving, from a transmission control unit 19d (described later), data that includes a anonymized data item identifying a person, the communicating unit 17 transmits the received data through the network 14 to a specified device among the devices 12a to 12c. In addition, when receiving, from the devices 12a, 12b and 12c through the network 14, data transmission instructions that each include a type ID of data to be analyzed, an application ID and an item to be analyzed, the communicating unit 17 transmits the received instructions to the control unit 19.

The storage unit 18 stores various types of information. For example, the storage unit 18 stores a DB 18a and a table 18b.

Figure 3:
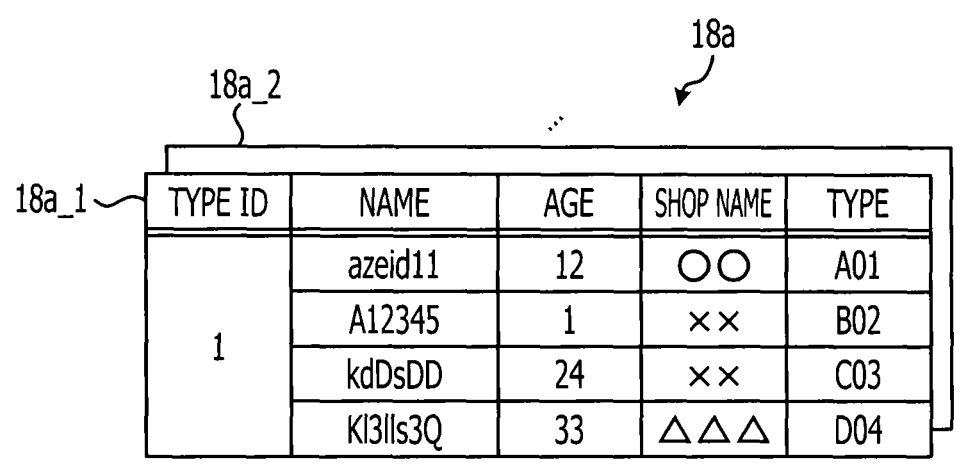

Tables that correspond to types of data, respectively, are registered in the DB 18a. FIG. 3 illustrates an example of data structures of the tables registered in the DB 18a included in the anonymity providing device 10. FIG. 3 illustrates a plurality of tables 18a_1, 18a_2, . . . . The tables 18a_1, 18a_2, . . . each have a "type ID" item in which a type ID that indicates the type of registered data is registered. In the example of FIG. 3, hash values of data that is of a type indicated by a type ID "1" or indicates purchase histories of purchasers of pets are registered in the table 18a_1.

Anonymized data that is transmitted from the devices 11a and 11b and the device (not illustrated) is registered by a registering unit 19b (described later) in the tables registered in the DB 18a. For example, when the data registered in the table illustrated in the example of FIG. 2 is made anonymous and transmitted from the devices 11a and 11b to the anonymity providing device 10, the anonymized data is registered in the table 18a_1, as illustrated in the example of FIG. 3.

The table 18b is a table in which keys that are used to generate hash values, and application IDs that identify applications, are associated with each other and registered. In the table 18b, the different keys are associated with the plurality of application IDs, respectively, and the keys and the application IDs are registered. FIG. 4 illustrates an example of a data structure of the table 18b included in the anonymity providing device 10. In the example of FIG. 4, the table 18b has an "application" item and a "key" item. In the "application" item, application IDs are registered. In the "key" item, keys that are used to generate hash values are registered. FIG. 4 illustrates the case where an application ID "A" and a key "00001" are associated with each other and registered in the table 18b.

The storage unit 18 is a semiconductor memory device such as a flash memory or a storage device such as a hard disk or an optical disc. The storage unit 18 is not limited to the memory device and the storage device and may be a random access memory (RAM) or a read only memory (ROM).

The control unit 19 has an internal memory that stores control data and a program in which process procedures of various types are defined. The control unit 19 executes various processes using the control data and the program. The control unit 19 has a receiving unit 19a, the registering unit 19b, a anonymity providing unit 19c and the transmission control unit 19d.

The receiving unit 19a receives various types of information. For example, when anonymized data is transmitted from the communicating unit 17 to the control unit 19, the receiving unit 19a receives the transmitted data. In addition, when data transmission instructions that each include a type ID of data to be analyzed, an application ID and an item to be analyzed are transmitted from the communicating unit 17 to the control unit 19, the receiving unit 19a receives the transmitted instructions.

The registering unit 19b registers various types of information. For example, when the receiving unit 19a receives data having a type ID added thereto, the registering unit 19b acquires the type ID added to the received data. Then, the registering unit 19b searches the DB 18a and determines whether or not a table that corresponds to the acquired type ID exists in the DB 18a. If the table that corresponds to the acquired type ID exists, the registering unit 19b registers the received data in the table that is among a plurality of tables registered in the DB 18a and corresponds to the acquired type ID. For example, when receiving the data having the type ID "1" added thereto from the device 11a, the anonymity providing device 10 registers the received data in the table 18a_1 that is among the plurality of tables (illustrated in the example of FIG. 3) 18a_1, 18a_2, . . . and corresponds to the type ID "1". Thus, the anonymized data that indicates the anonymous purchase histories of the purchasers of the pets is registered in the table 18a_1 corresponding to the type ID "1".

On the other hand, if the table that corresponds to the acquired type ID does not exist, the registering unit 19b generates a new table and registers the acquired type ID in the "type ID" item of the generated table. In addition, the registering unit 19b adds records for the number of records of the received data to the generated table and registers the data received by the receiving unit 19a in the added records.

Every time the receiving unit 19a receives data having a type ID added thereto, the registering unit 19b executes the aforementioned process and registers the anonymized data in a table of the DB 18a.

When the receiving unit 19a receives the aforementioned data transmission instructions, the anonymity providing unit 19c executes the following process. That is, the anonymity providing unit 19c acquires the anonymized data registered in the table corresponding to the data type identified by the type ID included in the instructions. Then, the anonymity providing unit 19c makes the anonymous name data included in the acquired data anonymous so that anonymous results are different for the types of applications (described later) that have provided the instructions.

A specific example is described below. For example, when receiving, from the devices 12a, 12b and 12c, data transmission instructions that each include a type ID of data to be analyzed, an application ID and an item to be analyzed, the anonymity providing unit 19c executes the following process. That is, the anonymity providing unit 19c acquires the type ID, the application IDs and the items to be analyzed, which are included in the instructions.

Then, the anonymity providing unit 19c searches the table 18b and determines whether or not a key that corresponds to the acquired application ID exists in the table 18b. If the key exists as a result of the search, the anonymity providing unit 19c acquires the key corresponding to the acquired application ID from the table 18b. For example, if the acquired application ID is "A", the anonymity providing unit 19c acquires the key "00001" from the table 18b illustrated in the example of FIG. 4. On the other hand, if the key does not exist as the result of the search, the anonymity providing unit 19c generates a new key that is not the same as the keys registered in the table 18b. Then, the anonymity providing unit 19c associates the acquired application ID and the generated key with each other and registers the acquired application ID and the generated key in the table 18b.

Then, the anonymity providing unit 19c searches the DB 18a and determines whether or not a table that corresponds to a data type identified by the acquired type ID exists in the DB 18a. If the table exists as a result of the search, the anonymity providing unit 19c acquires data of all records of the table corresponding to the data type identified by the acquired type ID. For example, if the acquired type ID is "1", the anonymity providing unit 19c acquires data of all records registered in the table 18a_1 that is among the plurality of tables registered in the DB 18a illustrated in the example of FIG. 3 and corresponds to the type ID "1".

Then, the anonymity providing unit 19c uses the acquired or generated key and a predetermined hash function to generate hash values for a data item that is included in the acquired data of all the records and identifies persons. For example, the anonymity providing unit 19c further generates hash values for anonymous name data. The name data is described as an example of the data identifying the persons, but is not limited to the data identifying the persons. As long as the hash values are generated for the data that identifies the persons and are an address, ID or the like of the person, the anonymity providing unit 19c may further generate the hash values using the same method.

For example, if the acquired or generated key is "00001", the anonymity providing unit 19c uses the key "00001" and the predetermined hash function to generate a hash value "AAAAA for anonymous name data "azeid11". In addition, the anonymity providing unit 19c generates a hash value "BBBBB" for anonymous name data "A12345". The anonymity providing unit 19c generates a hash value "CCCCC" for anonymous name data "kdDsDD". The anonymity providing unit 19c generates a hash value "DDDDD" for anonymous name data "Kl3lls3Q".

For example, if the acquired or generated key is "00002", the anonymity providing unit 19c uses the key "00002" and the predetermined hash function to generate a hash value "EEEEE" for the anonymous name data "azeid11". In addition, the anonymity providing unit 19c generates a hash value "FFFFF" for the anonymous name data "A12345". The anonymity providing unit 19c generates a hash value "GGGGG" for the anonymous name data "kdDsDD". The anonymity providing unit 19c generates a hash value "HHHHH" for the anonymous name data "Kl3lls3Q".

If the acquired or generated key is "00003", the anonymity providing unit 19c uses the key "00003" and the predetermined hash function to generate a hash value "IIIII" for the anonymous name data "azeid11". In addition, the anonymity providing unit 19c generates a hash value "JJJJJ" for the anonymous name data "A12345". The anonymity providing unit 19c generates a hash value "KKKKK" for the anonymous name data "kdDsDD". The anonymity providing unit 19c generates a hash value "LLLLL" for the anonymous name data "Kl3lls3Q".

Subsequently, the anonymity providing unit 19c replaces the anonymized data item included in the acquired data of all the records and identifying the persons with the hash values. Thus, the data item that identifies the persons is made anonymous again. For example, if the aforementioned acquired or generated key is "00001", the anonymity providing unit 19c replaces the name data "azeid11" with the hash value "AAAAA". In addition, the anonymity providing unit 19c replaces the name data "A12345" with the hash value "BBBBB". The anonymity providing unit 19c replaces the name data "kdDsDD" with the hash value "CCCCC". The anonymity providing unit 19c replaces the name data "Kl3lls3Q" with the hash value "DDDDD". In this manner, the anonymity providing unit 19c uses the different keys for the types of the applications executed by the devices 12a, 12b and 12c to generate the hash values for the anonymized data identifying the persons and replaces the data with the hash values. Thus, even if anonymized data that identify persons is the same, the anonymized data may be made anonymous again by the anonymity providing unit 19c so that anonymous results are different for the types of the applications. Thus, generation of data that is common to the plurality of applications may be suppressed. The anonymity providing unit 19c, therefore, may make it difficult to interpret anonymized data.

Then, the anonymity providing unit 19c releases the anonymity of the data item that identifies the persons and is included in the data and has been replaced with the hash values and registered in the items that are to be analyzed and are included in the received instructions. For example, the anonymity providing unit 19c executes the following process on the data including the data item replaced with the hash values and identifying the persons. That is, the anonymity providing unit 19c uses the same key as the key used for the anonymity by the devices 11a and 11b and the device (not illustrated) and the same hash function as the hash function used for the anonymity and thereby restores the hash values of the items to be analyzed to the original data.

For example, when the receiving unit 19a receives, from the device 12a, a data transmission instruction that includes the type ID "1" of data to be analyzed, the application ID "A" and the item "type" to be analyzed, the anonymity providing unit 19c executes the following process. That is, the anonymity providing unit 19c restores, to the original data, hash values that have been registered in the "type" item to be analyzed and are among the hash values with which the data item that identifies the persons has been replaced. FIG. 5 illustrates an example of data when hash values of the "type" item to be analyzed are restored to the original data. For example, when acquiring data of hash values of all the records registered in the table 18a_1 corresponding to the type ID "1", the anonymity providing unit 19c restores a hash value "A01" of the "type" item to be analyzed to the original data "bird". In addition, the anonymity providing unit 19c restores a hash value "B02" of the "type" item to be analyzed to the original data "dog". The anonymity providing unit 19c restores a hash value "C03" of the "type" item to be analyzed to the original data "turtle". The anonymity providing unit 19c restores a hash value "D04" of the "type" item to be analyzed to the original data "cat".

When the receiving unit 19a receives, from the device 12b, a data transmission instruction that includes the type ID "1" of the data to be analyzed, the application ID "B" and the "shop name" item to be analyzed, the anonymity providing unit 19c executes the following process. That is, the anonymity providing unit 19c restores, to the original data, hash values that have been registered in the "shop name" item to be analyzed and are among the hash values with which the data item that identifies the persons has been replaced. FIG. 6 illustrates an example of data when the hash values of the "shop name" item to be analyzed are restored to the original data by the anonymity providing unit 10. For example, when acquiring the data of the hash values of all the records registered in the table 18a_1 corresponding to the type ID "1", the anonymity providing unit 19c restores a hash value "00" of the "shop name" item to be analyzed to the original data "shop A", as illustrated in the example of FIG. 6. In addition, the anonymity providing unit 19c restores hash values "xx" of the "shop name" item to be analyzed to the original data "shop B". The anonymity providing unit 19c restores a hash value "ΔΔΔ" of the "shop name" item to be analyzed to the original data "shop D".

When the receiving unit 19a receives, from the device 12c, a data transmission instruction that includes the type ID "1" of the data to be analyzed, the application ID "C" and the "age" item to be analyzed, the anonymity providing unit 19c executes the following process. That is, the anonymity providing unit 19c restores, to the original data, hash values that have been registered in the "age" item" to be analyzed and are among the hash values with which the data item that identifies the persons has been replaced. FIG. 7 illustrates an example of data when the hash values of the "age" item to be analyzed are restored to the original data by the anonymity providing device 10. For example, when acquiring the data of the hash values of all the records registered in the table 18a_1 corresponding to the type ID "1", the anonymity providing unit 19c restores a hash value "12" of the "age" item to be analyzed to the original data "22", as illustrated in the example of FIG. 7. In addition, the anonymity providing unit 19c restores a hash value "1" of the "age" item to be analyzed to the original data "32". The anonymity providing unit 19c restores a hash value "24" of the "age" item to be analyzed to the original data "44". The anonymity providing unit 19c restores a hash value "33" of the "age" item to be analyzed to the original data "52".

The transmission control unit 19d controls the anonymity providing device 10 so as to cause the anonymity providing device 10 to transmit data including a data item identifying a person and made anonymous by the anonymity providing unit 19c again to a device that executes an application that has provided an instruction to transmit the data. Specifically, the transmission control unit 19d transmits, to the communicating unit 17, data including a data item of which anonymity has been released in order to transmit the data to the device that has transmitted the instruction. For example, the transmission control unit 19d transmits, to the communicating unit 17, the original data (illustrated in FIG. 5) restored from the hash values of the "type" item to be analyzed in order to transmit the original data to the device 12a. In addition, the transmission control unit 19d transmits, to the communicating unit 17, the original data (illustrated in FIG. 6) restored from the hash values of the "shop name" item to be analyzed in order to transmit the original data to the device 12b. The transmission control unit 19d transmits, to the communicating unit 17, the original data (illustrated in FIG. 7) restored from the hash values of the "age" item to be analyzed in order to transmit the original data to the device 12c.

The control unit 19 is a processor such as an integrated circuit (an application specific integrated circuit (ASIC) or a field programmable gate array (FPGA), for example) or an electronic circuit (a central processing unit (CPU) or a micro processing unit (MPU), for example).

The devices 12a, 12b and 12c are devices that execute various types of analysis. For example, the device 12a uses the data indicating the purchase histories of the purchasers of the pets and executes the application for counting the number of pets for each of the types of the pets. The device 12a executes the application and thereby transmits, to the anonymity providing device 10, the data transmission instruction that includes the type ID "1" of the data to be analyzed, the application ID "A" and the "type" item to be analyzed. In addition, when receiving, from the anonymity providing device 10, the original data restored from the hash values of the item "type" to be analyzed, the device 12a counts the number of purchased pets for each of the types of the purchased pets.

The device 12b uses the data indicating the purchase histories of the purchasers of the pets and executes the application for counting the number of pets for each of the pet shops. The device 12b executes the application and thereby transmits, to the anonymity providing device 10, the data transmission instruction that includes the type ID "1" of the data to be analyzed, the application ID "B" and the "shop name" item to be analyzed. In addition, when receiving, from the anonymity providing device 10, the original data restored from the hash values of the "shop name" item to be analyzed, the device 12b counts the number of purchased pets for each of the pet shops.

The device 12c uses the data indicating the purchase histories of the purchasers of the pets and executes the application for counting the number of pets for each of the ages of the purchasers. The device 12c executes the application and thereby transmits, to the anonymity providing device 10, the data transmission instruction that includes the type ID "1" of the data to be analyzed, the application ID "C" and the "age" item to be analyzed. In addition, when receiving, from the anonymity providing device 10, the original data restored from the hash values of the "age" item to be analyzed, the device 12c counts the number of purchased pets for each of the ages of the purchasers of the pets.

Figure 8:
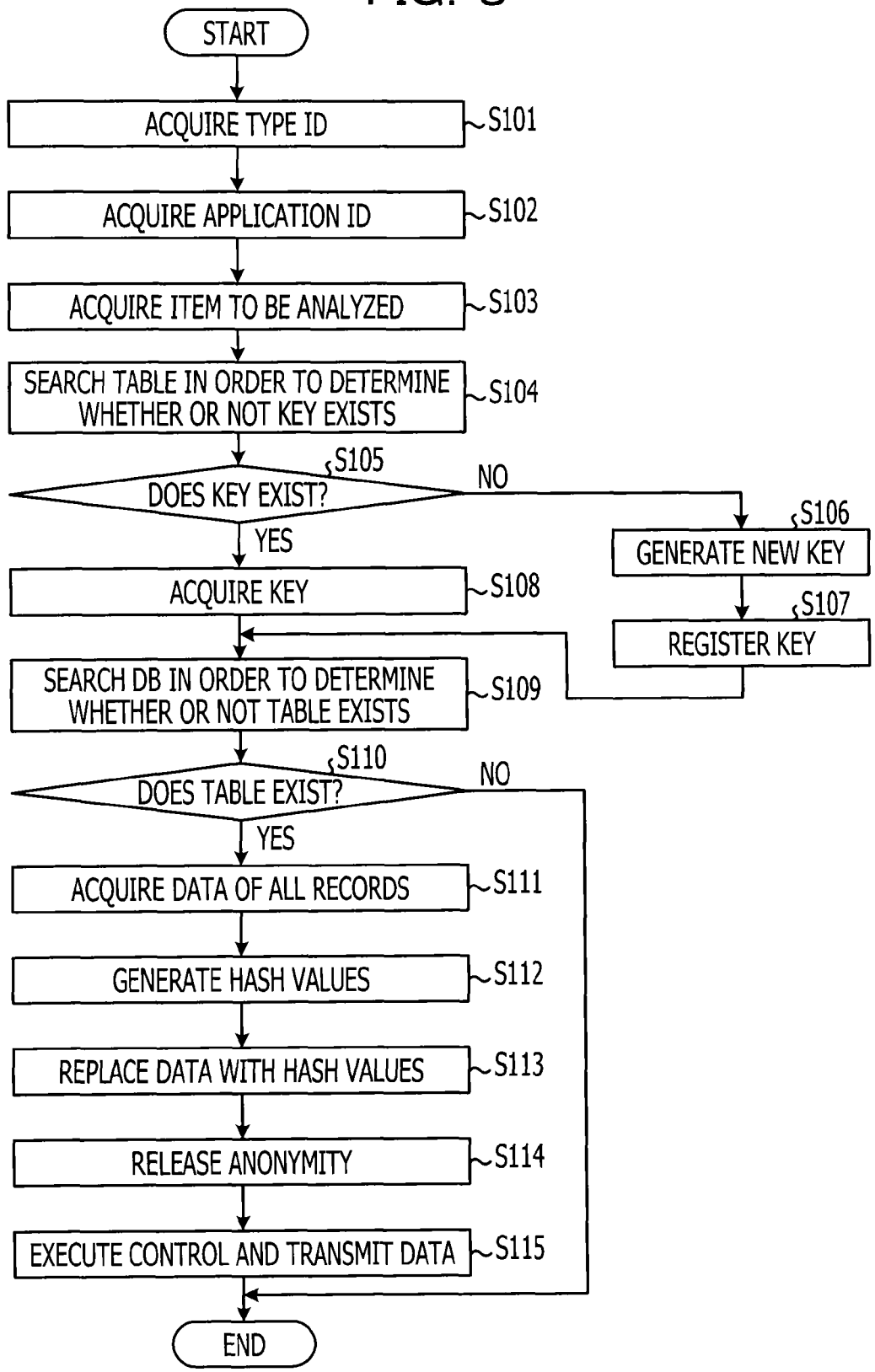
FIG. 8 is a flowchart of a procedure for a anonymity providing process.

Next, a process that is executed by the anonymity providing device 10 according to the present embodiment is described. FIG. 8 is a flowchart of a procedure for the anonymity providing process. The anonymity providing process is executed when the anonymity providing device 10 receives, from the device 12a, 12b or 12c, a data transmission instruction that include a type ID of data to be analyzed, an application ID and an item to be analyzed.

As illustrated in FIG. 8, the anonymity providing unit 19c acquires the type ID included in the instruction (in S101). Then, the anonymity providing unit 19c acquires the application ID included in the instruction (in S102). The anonymity providing unit 19c acquires the item that is to be analyzed and is included in the instruction (in S103).

Then, the anonymity providing unit 19c searches the table 18b in order to determine whether or not a key that corresponds to the acquired application ID exists in the table 18b (in S104). Subsequently, the anonymity providing unit 19c determines whether or not the key exists as a result of the search (in S105). If the key exists (Yes in S105), the anonymity providing unit 19c acquires the key corresponding to the acquired application ID from the table 18b (in S108). On the other hand, if the key does not exist (No in S105), the anonymity providing unit 19c generates a new key that is not the same as the keys registered in the table 18b (in S106). Then, the anonymity providing unit 19c associates the acquired application ID and the generated key with each other and registers the acquired application ID and the generated key in the table 18b (in S107).

After that, the anonymity providing unit 19c searches the DB 18a in order to determine whether or not a table that corresponds to a data type identified by the acquired type ID exists in the DB 18a (in S109). Then, the anonymity providing unit 19c determines whether or not the table exists as a result of the search (in S110). If the table does not exist (No in S110), the process is terminated. On the other hand, if the table exists (Yes in S110), the anonymity providing unit 19c acquires data of all records of the table corresponding to the data type identified by the acquired type ID (in S111).

Then, the anonymity providing unit 19c uses the acquired or generated key and the predetermined hash function to generate hash values for a anonymized data item that is, for example, name data and included in the acquired data of all the records and identifies persons (in S112).

Subsequently, the anonymity providing unit 19c replaces the anonymized data item included in the acquired data of all the records and identifying the persons with the generated hash values (in S113). Then, the anonymity providing unit 19c releases the anonymity of the data item that identifies the persons, has been made anonymous using the hash values and registered in the item that is included in the received instruction and is to be analyzed (in S114).

After that, the transmission control unit 19d transmits, to the communicating unit 17, the data including the data that has been registered in the item to be analyzed and of which the anonymity has been released, in order to transmit the data to the device that has transmitted the instruction (in S115). Then, the transmission control unit 19d terminates the process.

As described above, the anonymity providing device 10 according to the present embodiment uses the different keys for the types of the applications executed by the devices 12a, 12b and 12c, generates the hash values for the anonymized data identifying the persons and replaces the anonymized data identifying the persons with the generated hash values. Thus, the anonymity providing device 10 may make the same anonymized data identifying persons anonymous so as to obtain different anonymous results for the types of the applications. Since the anonymity providing device 10 may make the same anonymized data identifying the persons anonymous so as to obtain the different anonymous results for the applications, generation of anonymized data that identifies persons and is common to the applications may be suppressed. The anonymity providing device 10, therefore, may make it difficult to interpret anonymized data.

The anonymity providing device 10 may use the following method to restore, to the original data, data that includes a anonymized data item identifying persons and replaced with hash values. That is, the anonymity providing device 10 may restore the data to the original data using the same key as a key registered in the table 18b and a key used to make data anonymous by the devices 11a and 11b and the device (not illustrated).

Second Embodiment

The second embodiment is described below. The second embodiment describes the case where when the same data items exist in anonymized data that is included in all records acquired from the DB 18a and identifies persons, the same data items are made anonymous so that anonymous results are different from each other.

Figure 9:
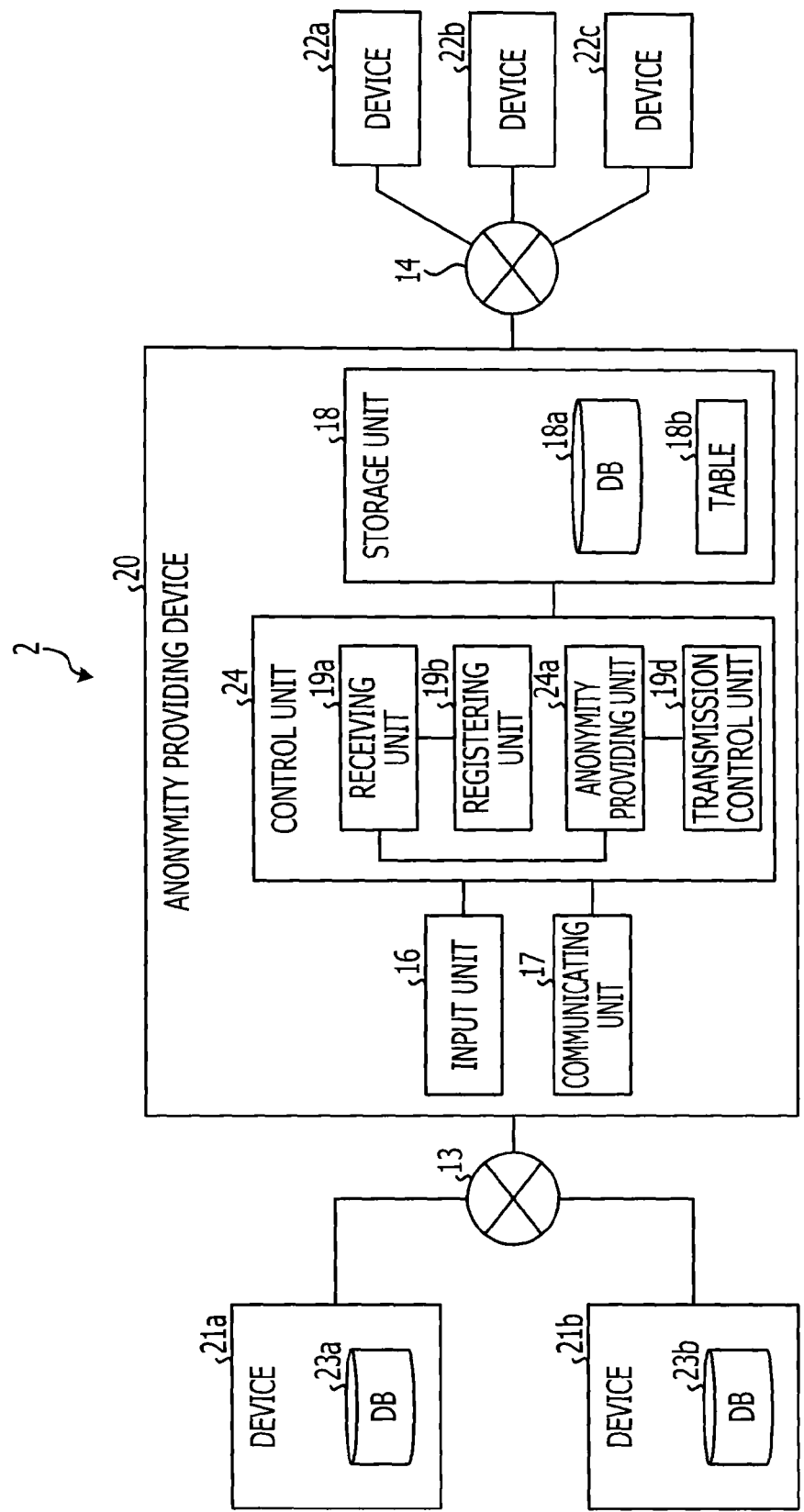
FIG. 9 illustrates an example of the configuration of a system that includes a anonymity providing device according to a second embodiment.

FIG. 9 illustrates an example of the configuration of a system that includes a anonymity providing device 20 according to the second embodiment. As illustrated in FIG. 9, a system 2 includes devices 21a, 21b, 22a, 22b and 22c and the anonymity providing device 20 instead of the devices 11a, 11b, 12a, 12b and 12c and the anonymity providing device 10, which are described in the first embodiment. Thus, the system 2 is different in the aforementioned point from the system 1 described in the first embodiment. Parts that have the same functions as those described in the first embodiment are indicated by the same reference numerals and symbols as those described in the first embodiment, and a description thereof is omitted.

Figure 10:
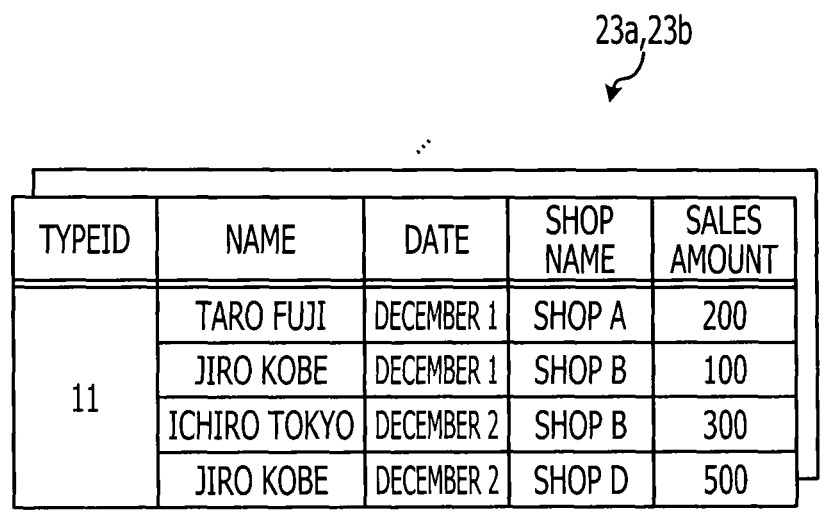
FIG. 10 illustrates an example of data structures of DBs.

The devices 21a and 21b have DBs 23a and 23b, respectively, while data that indicates purchase histories of purchasers who have purchased pets such as animals at pet shops is registered in the DBs 23a and 23b. FIG. 10 illustrates an example of data structures of the DBs 23a and 23b. A table is registered for each of types of data in each of the DBs 23a and 23b illustrated in the example of FIG. 10. A "name" item, a "date" item, a "shop name" item and a "sales amount" item are included in each of records of a table illustrated in the example of FIG. 10. Dates on which the purchasers have purchased the pets are registered in the "date" item. Amounts of money paid for the pets by the purchasers are registered in the "sales amount" item. In addition, the table illustrated in the example of FIG. 10 includes a "type ID" item in which a type ID that identifies the type of data registered in each of the DBs 23a and 23b is registered. As described above, the data that indicates the purchase histories of the purchasers of the pets is registered in the table (illustrated in the example of FIG. 10) of each of the DBs 23a and 23b. The data has the "name" item, the "date" item, the "shop name" item and the "sales amount" item. A type ID "11" is registered in the "type ID" item of the table of each of the DBs 23a and 23b illustrated in the example of FIG. 10. The type ID "11" identifies the data that includes the "name" item, the "date" item, the "shop name" item and the "sales amount" item and indicates the purchase histories of the purchasers of the pets.

The devices 21a and 21b acquire data of one or more records from the DBs 23a and 23b and make the acquired data anonymous. For example, the devices 21a and 21b use a predetermined key and a predetermined hash function to calculate hash values for the acquired data of items of the records, replace the acquired data of the items of the records with data of the calculated hash values, and make the acquired data anonymous. Then, the devices 21a and 21b add the type ID registered in the "type ID" item of the table of the DBs 23a and 23b to the anonymized data. Subsequently, the devices 21a and 21b transmit the data having the type ID added thereto to the anonymity providing device 20. It is assumed that the system 2 includes the devices 21a and 21b and another device (not illustrated) that makes various types of data anonymous using the same method as described above and transmits the anonymized data to the anonymity providing device 20.

Figure 11:
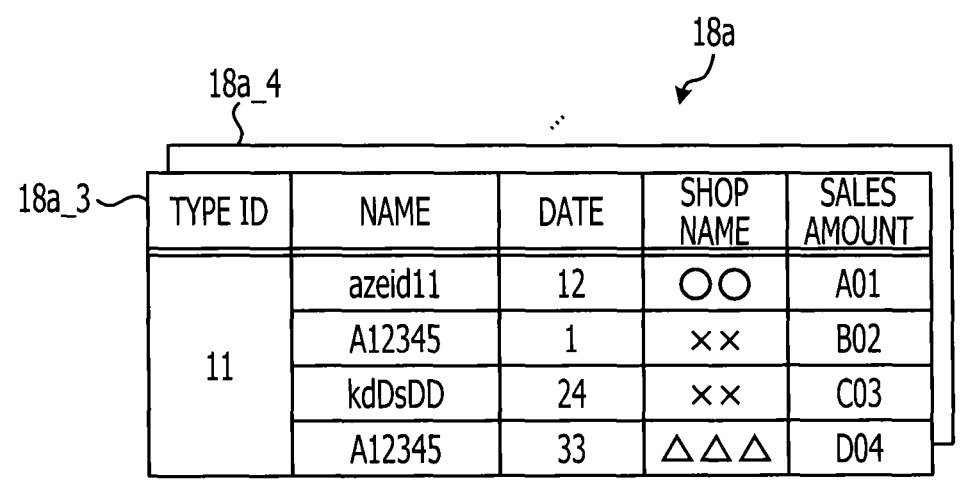

The DB 18a according to the second embodiment is described below. FIG. 11 illustrates an example of data structures of tables registered in the DB 18a included in the anonymity providing device 20. FIG. 11 illustrates a plurality of tables 18a_3, 18a_4, . . . . The tables 18a_3, 18a_4, . . . each have a "type ID" item in which a type ID that identifies the type of registered data is registered. In the example of FIG. 11, hash values of data that is of a type identified by the type ID "11" or has the aforementioned items and indicates the purchase histories of the purchasers of the pets are registered in the table 18a_3.

Anonymized data that is transmitted from the devices 21a and 21b and the device (not illustrated) is registered by the registering unit 19b in the tables registered in the DB 18a. For example, when data registered in the table illustrated in the example of FIG. 10 is made anonymous and transmitted from the devices 21a and 21b to the anonymity providing device 20, the anonymized data is registered in the table 18a_3, as illustrated in the example of FIG. 11.

A control unit 24 has an internal memory for storing control data and a program in which process procedures of various types are defined. The control unit 24 executes various processes using the control data and the program. As illustrated in FIG. 9, the control unit 24 has the receiving unit 19a, the registering unit 19b, a anonymity providing unit 24a and the transmission control unit 19d.

When the receiving unit 19a receives the aforementioned data transmission instructions, the control unit 24 executes the following process. That is, the anonymity providing unit 24a acquires anonymized data registered in the table corresponding to the data type identified by the type ID included in the instructions. Then, the anonymity providing unit 24a makes anonymous name data included in the acquired data anonymous so that anonymous results are different for the types of the aforementioned applications that have provided the instructions.

A specific example is described below. For example, when receiving, from the device 22a, 22b or 22c, a data transmission instruction that includes a type ID of data to be analyzed, an application ID and an item to be analyzed, the anonymity providing unit 24a executes the following process. That is, the anonymity providing unit 24a acquires the type ID, the application ID and the item to be analyzed, which are included in the instruction.

Then, the anonymity providing unit 24a searches the table 18b in order to determine whether or not a key that corresponds to the acquired application ID exists in the table 18b. If the key exists as a result of the search, the anonymity providing unit 24a acquires the key corresponding to the acquired application ID from the table 18b. For example, if the acquired application ID is "A", the anonymity providing unit 24a acquires the key "00001" from the table 18b illustrated in the example of FIG. 4. On the other hand, if the key does not exist as the result of the search, the anonymity providing unit 24a generates a new key that is not the same as the keys registered in the table 18b. Then, the anonymity providing unit 24a associates the acquired application ID and the generated key with each other and registers the acquired application ID and the generated key in the table 18b.

Subsequently, the anonymity providing unit 24a searches the DB 18a in order to determine whether or not a table corresponding to the data type identified by the acquired type ID exists in the DB 18a. If the table exists in the DB 18a as a result of the search, the anonymity providing unit 24a acquires data of all records of the table corresponding to the data type identified by the acquired type ID. If the acquired type ID is "11", the anonymity providing unit 24a acquires data of all records registered in the table 18a_3 corresponding to the type ID "11" from the plurality of tables registered in the DB 18a illustrated in the example of FIG. 11.

After that, the anonymity providing unit 24a determines whether or not a plurality of the same data items exist in anonymized data that is included in the acquired data of all the records and identifies persons. For example, when acquiring the data of all the records registered in the table 18a_3, the anonymity providing unit 24a determines that a plurality of the same data items "A12345" exist in the anonymized data that identifies the persons. If the plurality of the same data items exist, the anonymity providing unit 24a executes the following process. That is, the anonymity providing unit 24a uses the acquired or generated key and a predetermined hash function to generate hash values for data other than the same data items included in the anonymized data identifying the persons. For example, when determining that the plurality of the same data items "A12345" exist, the anonymity providing unit 24a calculates a hash value "j2a9f2e" for the anonymized data "azeid11" identifying a person. In addition, the anonymity providing unit 24a calculates a hash value "13kksow" for the anonymized data "kdDsDD" identifying a person.

Then, the anonymity providing unit 24a selects a single record from among a plurality of unselected records in which the same data items determined to exist have been registered. For example, when determining that the same data items "A12345" exist, the anonymity providing unit 24a selects an unselected second record from among the second and fourth records that are among all the records and in which "A12345" has been registered. Then, the anonymity providing unit 24a specifies an offset that indicates a relative position of the selected record to all the acquired records. An example of the offset is a value that indicates the order that the selected record is arranged. For example, if the second record is selected, the anonymity providing unit 24a specifies an offset "2". Then, the anonymity providing unit 24a uses the acquired or generated key and the predetermined hash function to generate a hash value for the same data item of the selected record. For example, if the second record is selected, the anonymity providing unit 24a uses the acquired or generated key and the predetermined hash function to generate a hash value "a12345" for the same data item "A12345" of the selected record.

Then, the anonymity providing unit 24a determines whether or not an unselected record exists among the plurality of records in which the same data items determined to exist have been registered. If the unselected record exists, the anonymity providing unit 24a selects the single unselected record. For example, if the anonymity providing unit 24a determines that the same data items "A12345" exist, the anonymity providing unit 24a selects the unselected fourth record from among the second and fourth records that are among all the records and in which "A12345" has been registered. Then, the anonymity providing unit 24a specifies an offset that indicates a relative position of the selected records to all the acquired records. For example, if the fourth record is selected, the anonymity providing unit 24a specifies an offset "4". Then, the anonymity providing unit 24a generates a new key that is not the same as the keys registered in the table 18b and a generated key if the generated key exists. Then, the anonymity providing unit 24a uses the generated new key and the predetermined hash function to generate a hash value for the aforementioned same data item of the selected record. For example, if the fourth record is selected, the anonymity providing unit 24a uses the generated new key and the predetermined hash function to execute the following process. That is, the anonymity providing unit 24a generates a hash value "c94ersy" for the same data item "A12345" of the selected record. The anonymity providing unit 24a repeatedly executes the process until an unselected record does not exist. Thus, if the same data items exist in anonymized data identifying persons, the anonymity providing device 20 may make the same data items anonymous so that anonymous results are different from each other.

Figure 12:
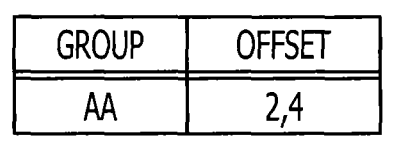

If the anonymity providing unit 24a determines that an unselected record does not exist, the anonymity providing unit 24a generates a group ID and group data that includes the group ID and the specified offsets. FIG. 12 illustrates an example of a data structure of the group data. Group data illustrated in the example of FIG. 12 includes a group ID "AA" and offsets "2" and "4".

If the anonymity providing unit 24a determines that a plurality of the same data items do not exist in the anonymized data included in the acquired data of all the records and identifying the persons and generates the group data, the anonymity providing unit 24a executes the following process. That is, the anonymity providing unit 24a uses the acquired or generated key and the predetermined hash function to generate hash values for the data item included in the acquired data of all the records and identifying the persons, for example, to generate hash values for the anonymous name data. Although an example of the data that identifies the persons is the name data, the data that identifies the persons is not limited to the name data. The anonymity providing unit 24a may further generate hash values using the same method as described above, as long as the hash values are generated for the data that identifies the persons and is addresses, IDs or the like of the persons.

Subsequently, the anonymity providing unit 24a replaces the anonymized data item included in the acquired data of all the records and identifying the persons with the generated hash values. Thus, the data item that identifies the persons is made anonymous again. In this manner, the anonymity providing unit 24a uses the different keys for the types of the applications executed by the devices 22a, 22b and 22c, generates hash values for anonymized data identifying persons, and replaces the data with the hash values. Thus, even if anonymized data that identifies persons is the same, the anonymity providing unit 24a may further make anonymous the anonymized data that identifies the persons so that anonymous results are different for the applications. Since the anonymity providing unit 24a makes the same anonymized data identifying persons anonymous so as to obtain different anonymous results for the applications, generation of anonymized data that identifies a person and is common to the applications may be suppressed. Thus, the anonymity providing unit 24a makes it difficult to interpret anonymized data.

Then, the anonymity providing unit 24a releases the anonymity of the data that corresponds to the item included in the received instruction and to be analyzed and is included in the data that includes the data item identifying the persons and replaced with the hash values. For example, the anonymity providing unit 24a executes the following process on the data that includes the data item identifying the persons and replaced with the hash values. That is, the anonymity providing unit 24a uses the same key as the key used for the anonymity by the devices 21a and 21b and the device (not illustrated) and the same hash function as the hash function used for the anonymity and thereby restores the hash values of the item to be analyzed to the original data.

For example, when the receiving unit 19a receives a data transmission instruction that includes the type ID "11" of data to be analyzed, the application ID "A" and the "sales amount" item to be analyzed, the anonymity providing unit 24a executes the following process. That is, the anonymity providing unit 24a restores, to the original data, hash values that are among data obtained by replacing a data item identifying persons with hash values and are included in the "sales amount" item to be analyzed. FIG. 13 illustrates an example of data when the anonymity providing device 20 generates hash values for name data using different keys and restores hash values of the "sales amount" item to be analyzed to the original data. For example, when acquiring data of hash values of all records registered in the table 18a_3 corresponding to the type ID "11", the anonymity providing unit 24a restores a hash value "A01" of the "sales amount" item to be analyzed to the original data "200", as illustrated in the example of FIG. 13. In addition, the anonymity providing unit 24a restores a hash value "B02" of the "sales amount" item to be analyzed to the original data "100". The anonymity providing unit 24a restores a hash value "C03" of the "sales amount" item to be analyzed to the original data "300". The anonymity providing unit 24a restores a hash value "D04" of the "sales amount" item to be analyzed to the original data "500".

The transmission control unit 19d executes control in order to transmit data including a data item identifying persons and made anonymous again by the anonymity providing unit 24a to a device that executes an application that has provided an instruction to transmit the data. Specifically, the transmission control unit 19d transmits, to the communicating unit 17, data that includes data that has been registered in an item to be analyzed and of which the anonymity has been released, in order to transmit the data to the device that has transmitted the instruction. For example, the transmission control unit 19d transmits, to the communicating unit 17, the data that is illustrated in FIG. 13 and includes the original data restored from the hash values. If the group data is generated by the anonymity providing unit 24a, the transmission control unit 19d transmits the generated group data to the communicating unit 17 in order to transmit the group data to the device that has transmitted the instruction.

The control unit 24 is processor such as an integrated circuit (an ASIC or an FPGA, for example) or an electronic circuit (a CPU or an MPU, for example).

Figure 14:
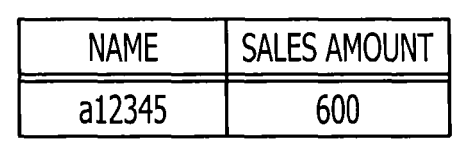

The devices 22a, 22b and 22c are devices that execute various types of analysis. For example, the device 22a uses data indicating purchase histories of purchasers of pets and executes an application for counting a sales amount for each of the purchasers. The device 22a executes the application and thereby transmits, to the anonymity providing device 20, a data transmission instruction that includes the type ID "11" of data to be analyzed, the application ID "A" and the "sales amount" item to be analyzed. In addition, when receiving, from the anonymity providing device 20, the original data restored from hash values of the "sales amount" item to be analyzed, the device 22a counts a sales amount for each of the purchasers. Furthermore, when the group data is transmitted from the anonymity providing device 20, the device 22a counts, as sales amounts of the same person, sales amounts indicated in the records of which the positions are indicated by the offsets included in the group data. Thus, even if different hash values are generated as results of making data anonymous again for the same person, the same person may be analyzed. For example, when the devices 22a, 22b and 22c receive the group data illustrated in the example of FIG. 12 and the data illustrated in the example of FIG. 13, the devices 22a, 22b and 22c count, as the sales amounts of the same person, the sales amounts "100" and "500" of the second and fourth records that are identified by the offsets "2, 4" and included in the data illustrated in the example of FIG. 13. FIG. 14 illustrates an example of an analysis result. The example of FIG. 14 indicates the case where a sales amount "600" is calculated as an analysis result of a sales amount of the person "a12345".

Figure 15:
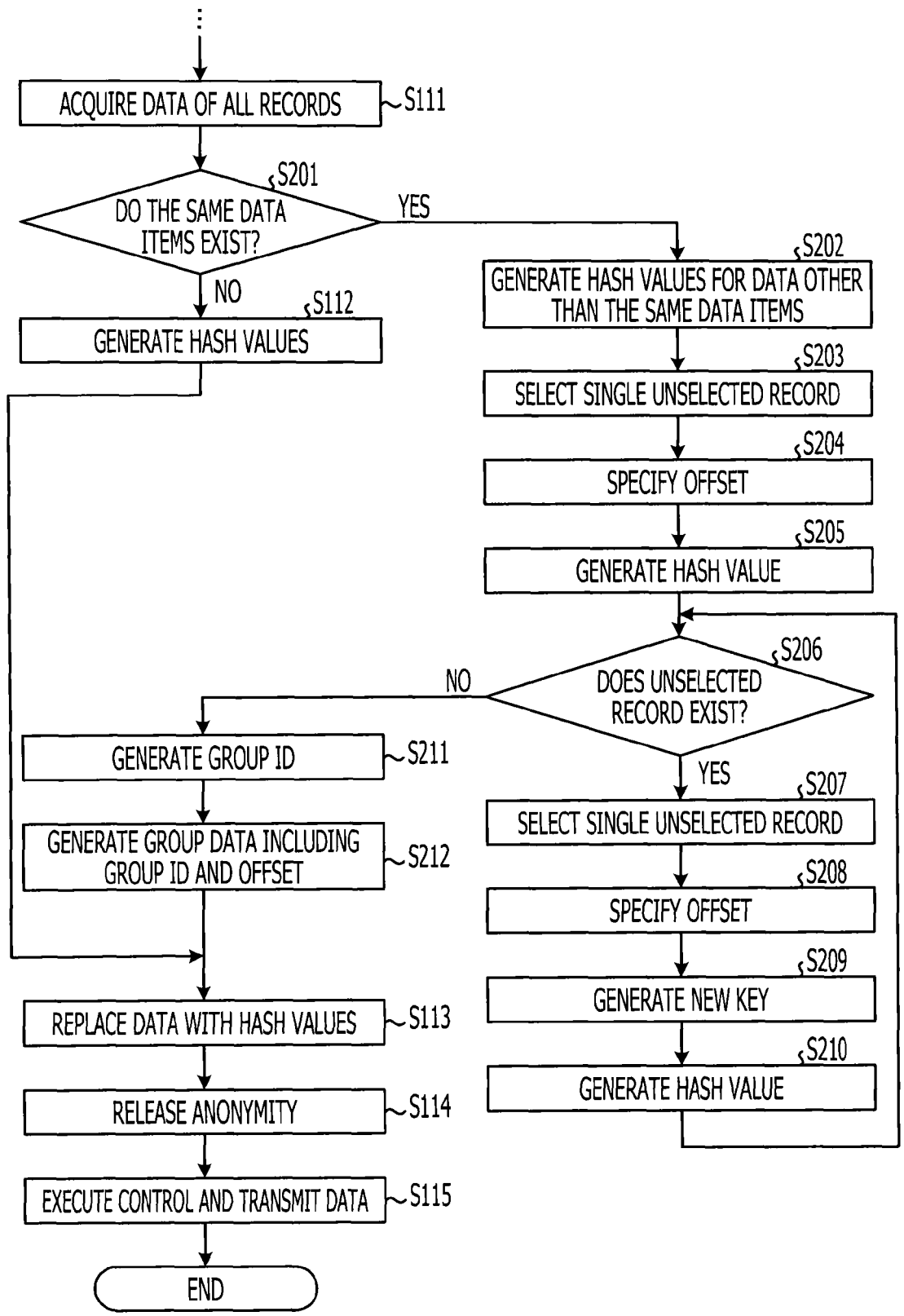
FIG. 15 is a flowchart of a procedure for a anonymity providing process.

Next, the flow of a process that is executed by the anonymity providing device 20 according to the present embodiment is described. FIG. 15 is a flowchart of a procedure for the anonymity providing process. The anonymity providing process is executed when the anonymity providing device 20 receives, from the device 22a, 22b or 22c, a data transmission instruction that includes a type ID of data to be analyzed, an application ID and an item to be analyzed.

As illustrated in FIG. 15, after S111, the anonymity providing unit 24a determines whether or not a plurality of the same data items exist in the anonymized data included in the acquired data of all the records and identifying the persons (in S201). If the same data items exist (Yes in S201), the anonymity providing unit 24a executes the following process. That is, the anonymity providing unit 24a uses the acquired or generated key and the predetermined hash function to generate a hash value for data that is included in the anonymized data identifying the persons and is not the same data items (in S202).

Subsequently, the anonymity providing unit 24a selects a single unselected record from among a plurality of records in which the same data items determined to exist have been registered (in S203). Then, the anonymity providing unit 24a specifies an offset that indicates a relative position of the selected record to all the acquired records (in S204). The anonymity providing unit 24a uses the acquired or generated key and the predetermined hash function to generate a hash value for the aforementioned same data item of the selected record (in S205).

Then, the anonymity providing unit 24a determines whether or not an unselected record exists among the plurality of records in which the same data items determined to exist have been registered (in S206). If the unselected record exists (Yes in S206), the anonymity providing unit 24a selects the single unselected record (in S207). Then, the anonymity providing unit 24a specifies an offset that indicates a relative position of the selected record to all the acquired records (in S208). Subsequently, the anonymity providing unit 24a generates a new key that is not the same as the keys registered in the table 18b and a generated key if the generated key exists (in S209). Then, the anonymity providing unit 24a uses the generated new key and the predetermined hash function to generate a hash value for the same data item of the selected record (in S210). Then, the process returns to S206.

On the other hand, if the unselected record does not exist (No in S206), the anonymity providing unit 24a generates a group ID (in S211). Then, the anonymity providing unit 24a generates group data that includes the group ID and the specified offset or offsets (in S212). Then, the process proceeds to S113.

As described above, the anonymity providing device 20 according to the present embodiment uses the different keys for the types of the applications executed by the devices 22a, 22b and 22c to generate hash values for anonymized data identifying persons and replaces the anonymized data identifying the persons with the hash values. Thus, even if anonymized data that identifies persons is the same, the anonymity providing device 20 may make anonymized data identifying the persons anonymous so as to obtain different anonymous results for the applications. Since the anonymity providing device 20 may make the same anonymized data identifying persons anonymous so as to obtain different anonymous results for the applications, generation of anonymized data that identifies persons and is common to the applications may be suppressed. The anonymity providing device 20, therefore, may make it difficult to interpret anonymized data.

In addition, if the same data items exist in anonymized data that identifies persons, the anonymity providing device 20 may make the same data items anonymous so as to obtain different anonymous results. Thus, the anonymity providing device 20 may make it difficult to interpret anonymized data.

The anonymity providing device 20 may use the following method to restore, to the original data, data that includes anonymized data identifying persons and replaced with hash values. That is, the anonymity providing device 20 may restore the data to the original data using the same key as a corresponding key registered in the table 18b and a key used for anonymity by the devices 21a, 21b and the device (not illustrated).

Although the embodiments of the anonymity providing device disclosed herein are described above, the anonymity providing device disclosed herein may be achieved in other embodiments. The other embodiments are described below.

The examples in which the anonymity providing devices 10 and 20 are physical servers are described above. The anonymity providing device disclosed herein is not limited to the aforementioned devices. For example, a physical server may execute a virtual machine (VM). The VM may execute the same processes as the processes that are executed by the anonymity providing devices 10 and 20.

All or a part of the processes that are described above in the embodiments and automatically executed may be manually executed. In addition, all or a part of the processes that are described above in the embodiments and manually executed may be automatically executed using a known method.

The processes that are executed in steps of the processes described in the embodiments may be each divided or be combined on the basis of various loads and usage statuses. In addition, one or more steps of the processes may be omitted.

The orders of the processes that are executed in steps of the processes described in the embodiments may be changed on the basis of various loads and usage statuses.

The constituent elements of the devices illustrated in the drawings are functionally conceptual and may not be physically configured as illustrated in the drawings. Specifically, specific forms of division and integration of the devices are not limited to those illustrated in the drawings, and all or a part of the devices may be functionally or physically divided or integrated on an arbitrary basis on the basis of various loads and usage statuses.

Figure 16:
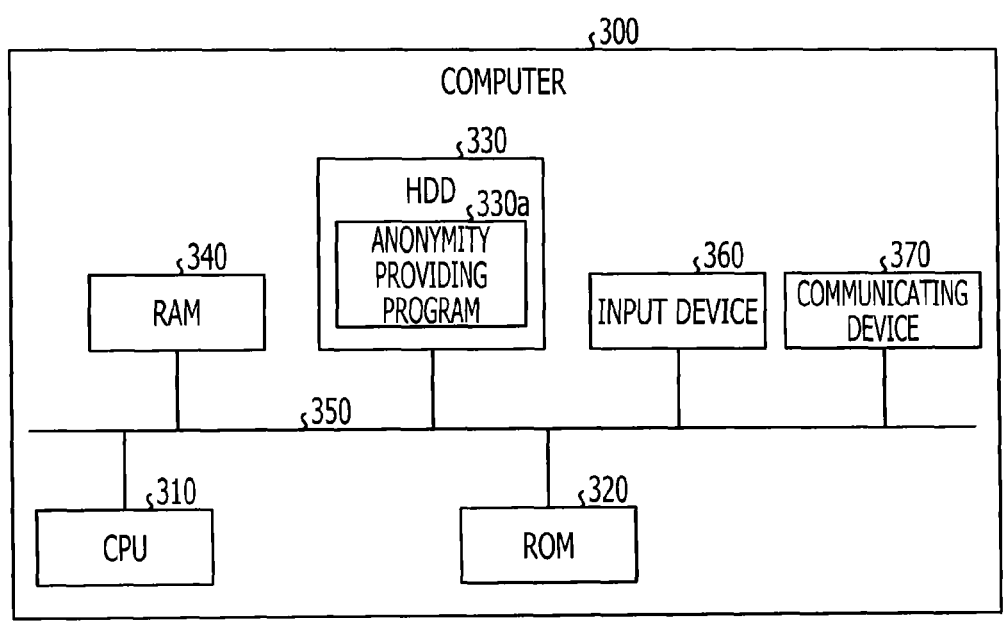
FIG. 16 illustrates a computer that executes a anonymity providing program.
Figure 17:
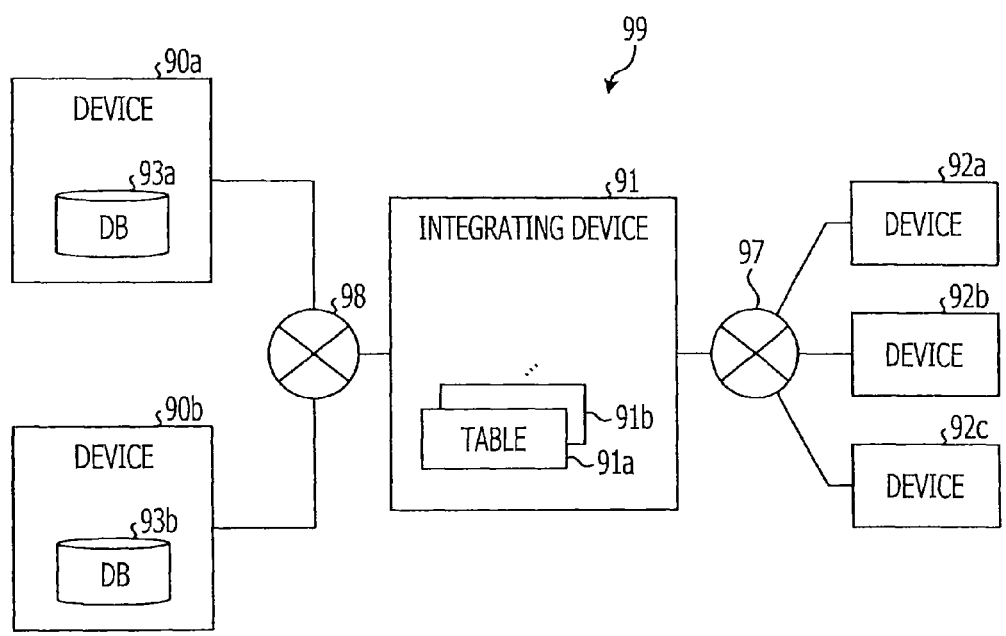
FIG. 17 illustrates an example of a system that includes an integrating device.

The processes that are executed by the anonymity providing devices 10 and 20 described in the embodiments may be achieved by causing a computer system such as a personal computer or a workstation to execute a prepared program. An example of the computer that executes the anonymity providing program that has the same functions as the anonymity providing devices described in the embodiments or the management servers is described with reference to FIG. 16. FIG. 16 illustrates a computer 300 that executes the anonymity providing program.

As illustrated in FIG. 16, the computer 300 includes a central processing unit (CPU) 310, a read only memory (ROM) 320, a hard disk drive (HDD) 330, a random access memory (RAM) 340. The computer 300 has an input device 360 and a communicating device 370. The devices 310, 320, 330, 340, 360 and 370 are connected to each other through a bus 350.

A basic program such as an OS is stored in the ROM 320. A anonymity providing program 330a that exhibits the functions of the receiving unit 19a, registering unit 19b, anonymity providing units 19c and 24a and transmission control unit 19d is stored in the HDD 330 in advance. The anonymity providing program 330a may be divided. The HDD 330 includes a DB and a table that correspond to the DB 18a and the table 18b, respectively.

The CPU 310 reads the anonymity providing program 330a from the HDD 330 and executes the anonymity providing program 330a.

Then, the CPU 310 reads the DB and the table and causes the DB and the table to be stored in the RAM 340. The CPU 310 executes the anonymity providing program 330a using the DB stored in the RAM 340 and the table stored in the RAM 340. In this case, all data may not be stored in the RAM 340. Specifically, it is sufficient if data to be used for a process is stored in the RAM 340.

The anonymity providing program 330a may not be stored in the HDD 330.

For example, the anonymity providing program 330a may be stored in a "portable physical medium" that is inserted in the computer 300 and is a flexible disk (FD), a CD-ROM, a DVD, a magneto-optical disc, an IC card or the like. The computer 300 may read the anonymity providing program 330a from the portable physical medium and execute the anonymity providing program 330a.

In addition, the anonymity providing program 330a may be stored in "another computer (or server)" connected to the computer 300 through a public line, the Internet, a LAN, a WAN or the like. The computer 300 may read the anonymity providing program 330a from the other computer and execute the anonymity providing program 330a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An anonymizing apparatus comprising:
   a processor configured to:
     receive a first instruction from a first application program executed in a first apparatus;
     anonymize an anonymized part of first data by replacing the anonymized part of the first data with a hash value calculated using a hash key corresponding to a type of the first application program to generate a first modified anonymized part;
     transmit anonymized first data including the first modified anonymized part to the first apparatus;
     receive a second instruction from a second application program executed in a second apparatus;
     anonymize an anonymized part of second data to generate a second modified anonymized part by anonymizing the anonymized part of the second data based on information identifying the second data when the anonymized part of the second data is same as the anonymized part of the first data and a type of the second application program is same as the type of the first application program so that the first modified anonymized part is different from the second modified anonymized part; and
     transmit anonymized second data including the second modified anonymized part to the second apparatus.

2. The anonymizing apparatus according to claim 1, wherein the processor is further configured to:
   anonymize the anonymized part of the second data to generate the second modified anonymized part based on information indicating a position of the second data stored in a memory when the anonymized part of the second data is same as the anonymized part of the first data and the type of the second application program is same as the type of the first application program.

3. An anonymizing method comprising:
   receiving a first instruction from a first application program executed in a first apparatus;
   anonymizing, by a processor, an anonymized part of first data by replacing the anonymized part of the first data with a hash value calculated using a hash key corresponding to a type of the first application program to generate a first modified anonymized part;
   transmitting anonymized first data including the first modified anonymized part to the first apparatus;
   receiving a second instruction from a second application program executed in a second apparatus;
   anonymizing an anonymized part of second data to generate a second modified anonymized part by anonymizing the anonymized part of the second data based on information identifying the second data when the anonymized part of the second data is same as the anonymized part of the first data and a type of the second application program is same as the type of the first application program so that the first modified anonymized part is different from the second modified anonymized part; and
   transmitting anonymized second data including the second modified anonymized part to the second apparatus.

4. The anonymizing method according to claim 3, further comprising:
   anonymizing the anonymized part of the second data to generate the second modified anonymized part based on information indicating a position of the second data stored in a memory when the anonymized part of the second data is same as the anonymized part of the first data and the type of the second application program is same as the type of the first application program.

5. A non-transitory computer-readable recording medium storing an anonymizing program that causes a computer to execute a process, the process comprising:
   receiving a first instruction from a first application program executed in a first apparatus;
   anonymizing an anonymized part of first data by replacing the anonymized part of the first data with a hash value calculated using a hash key corresponding to a type of the first application program to generate a first modified anonymized part;
   transmitting anonymized first data including the first modified anonymized part to the first apparatus;
   receiving a second instruction from a second application program executed in a second apparatus;
   anonymizing an anonymized part of second data to generate a second modified anonymized part by anonymizing the anonymized part of the second data based on information identifying the second data when the anonymized part of the second data is same as the anonymized part of the first data and a type of the second application program is same as the type of the first application program so that the first modified anonymized part is different from the second modified anonymized part; and
   transmitting anonymized second data including the second modified anonymized part to the second apparatus.

6. The non-transitory recording medium according to claim 5, wherein the process further comprising:
   anonymizing the anonymized part of the second data to generate the second modified anonymized part based on information indicating a position of the second data stored in a memory when the anonymized part of the second data is same as the anonymized part of the first data and the type of the second application program is same as the type of the first application program.

* * * * *